United States Patent [19]

Missimer

[11] Patent Number: 5,161,382
[45] Date of Patent: Nov. 10, 1992

[54] COMBINED CRYOSORPTION/AUTO-REFRIGERATING CASCADE LOW TEMPERATURE SYSTEM

[75] Inventor: Dale J. Missimer, San Anselmo, Calif.

[73] Assignee: Marin Tek, Inc., San Rafael, Calif.

[21] Appl. No.: 705,076

[22] Filed: May 24, 1991

[51] Int. Cl.⁵ ............................................ F17C 11/00
[52] U.S. Cl. ...................................... 62/46.1; 62/55.5; 62/335; 62/467
[58] Field of Search .................. 62/46.1, 46.2, 46.3, 62/467, 335, 55.5

[56] References Cited

U.S. PATENT DOCUMENTS

| | | | |
|---|---|---|---|
| 3,427,814 | 2/1969 | Lawley | 62/46.3 |
| 3,732,690 | 5/1973 | Meijer | 123/1 A |
| 4,165,569 | 8/1979 | Mackay | 62/46.2 |
| 4,178,987 | 12/1979 | Bowman et al. | 62/46.2 |
| 4,185,979 | 1/1980 | Woolley | 62/46.2 |
| 4,359,872 | 11/1982 | Goldowsky | 62/6 |
| 4,393,924 | 1/1983 | Asami et al. | 62/46.3 |
| 4,717,406 | 1/1988 | Giacobbe | 62/46.1 |
| 4,765,395 | 8/1988 | Paeye et al. | 62/335 |
| 4,788,829 | 12/1988 | Takemasa et al. | 62/335 |
| 5,072,592 | 12/1991 | Ishigaki | 62/55.5 |

*Primary Examiner*—Ronald C. Capossela
*Attorney, Agent, or Firm*—Owen, Wickersham & Erickson

[57] ABSTRACT

Apparatus for producing low temperature refrigeration comprising a refrigeration sub-system for circulating a first refrigerant to provide alternately two outputs for different time periods including a first output at a relatively warm temperature level and a second output at a relatively cold temperature level. The sub-system outputs are furnished to a cryosorption pumping circuit comprised of a closed loop conduit for a second refrigerant and connected to a plurality of sorbent beds which cause cyclic adsorption and desorption of the second refrigerant material. External conditioning utilizing the first refrigerant is used to cause further temperature reduction of said second refrigerant in the closed loop conduit of the cryosorption pumping circuit.

21 Claims, 5 Drawing Sheets

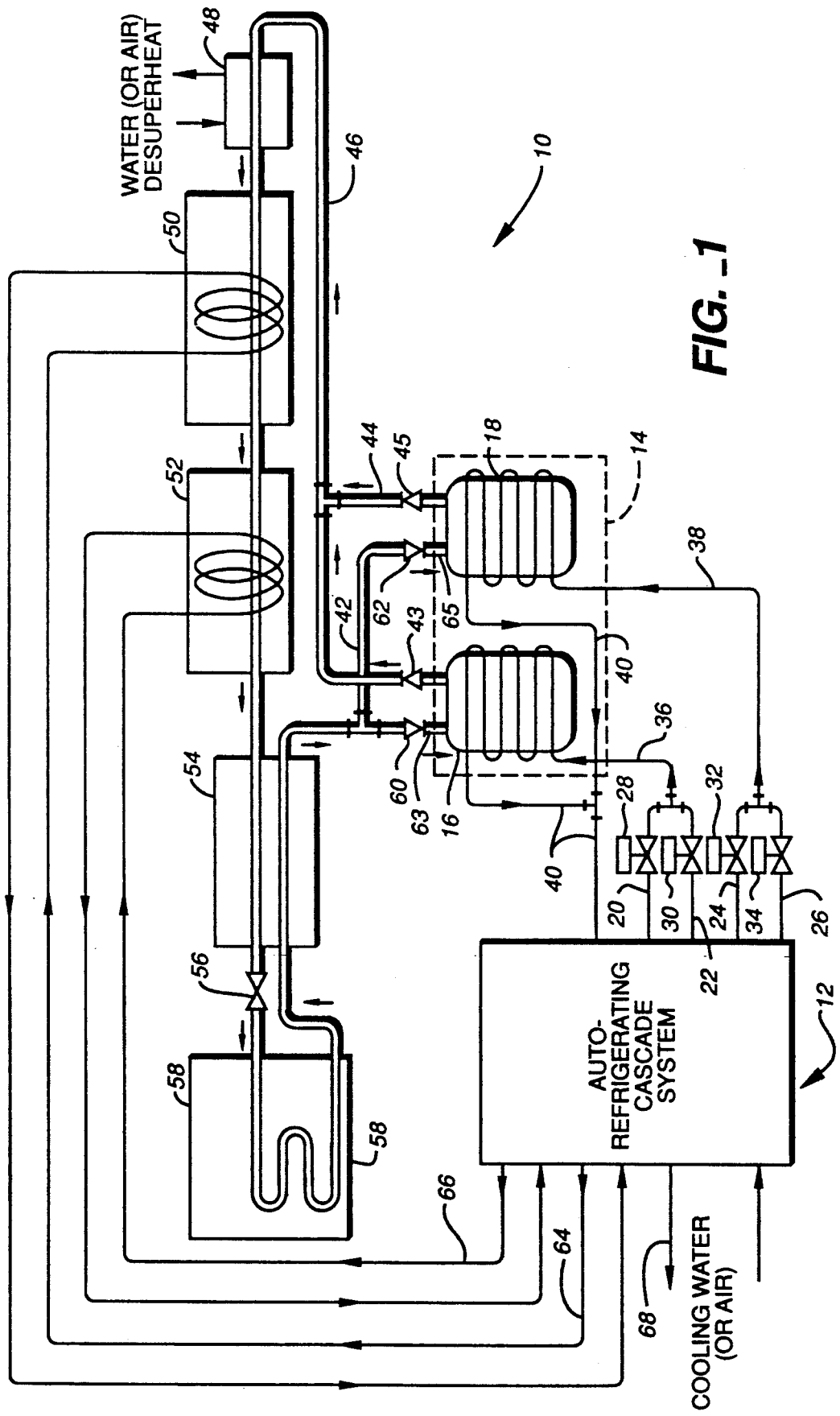
FIG. _1

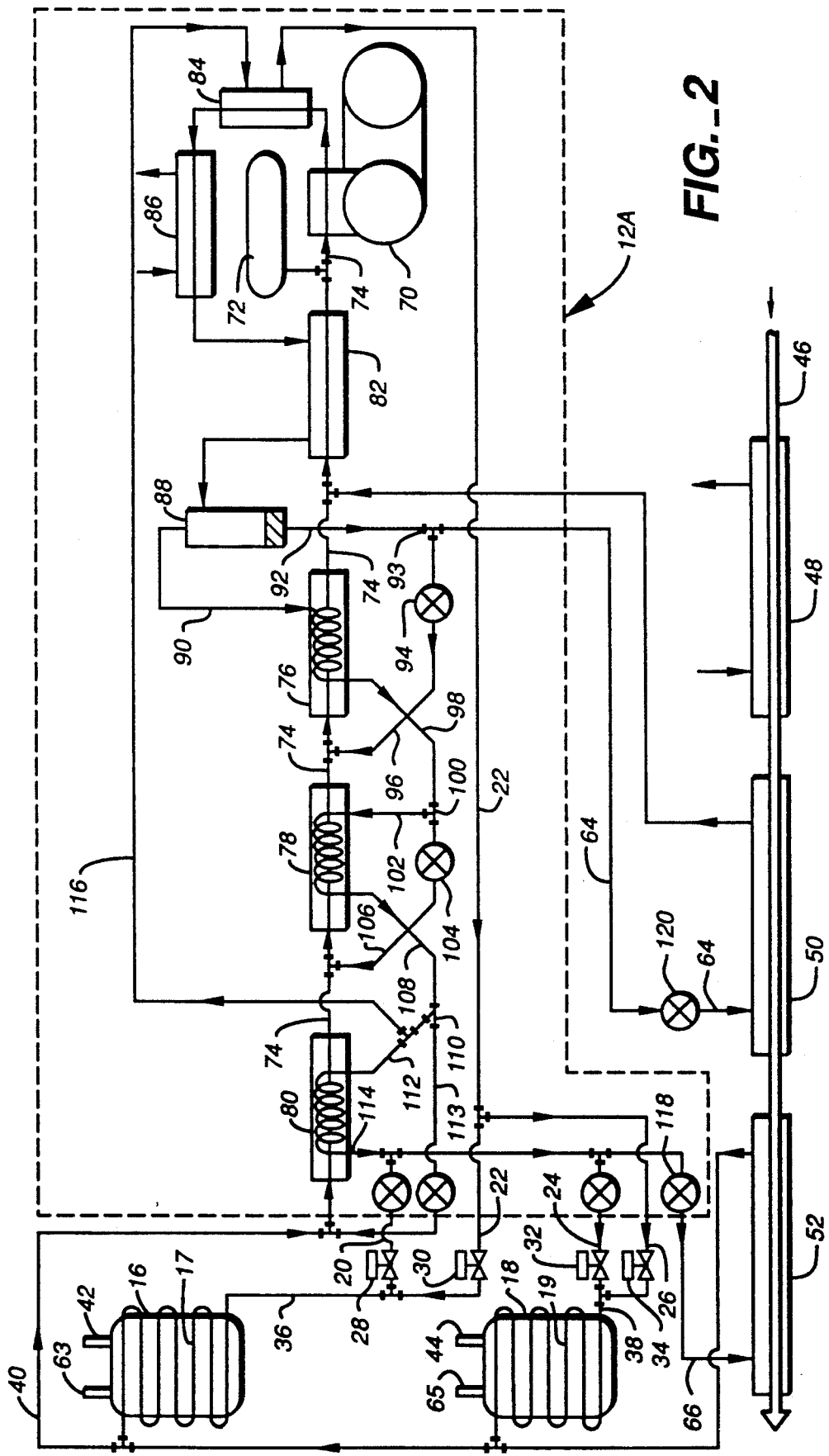
FIG._2

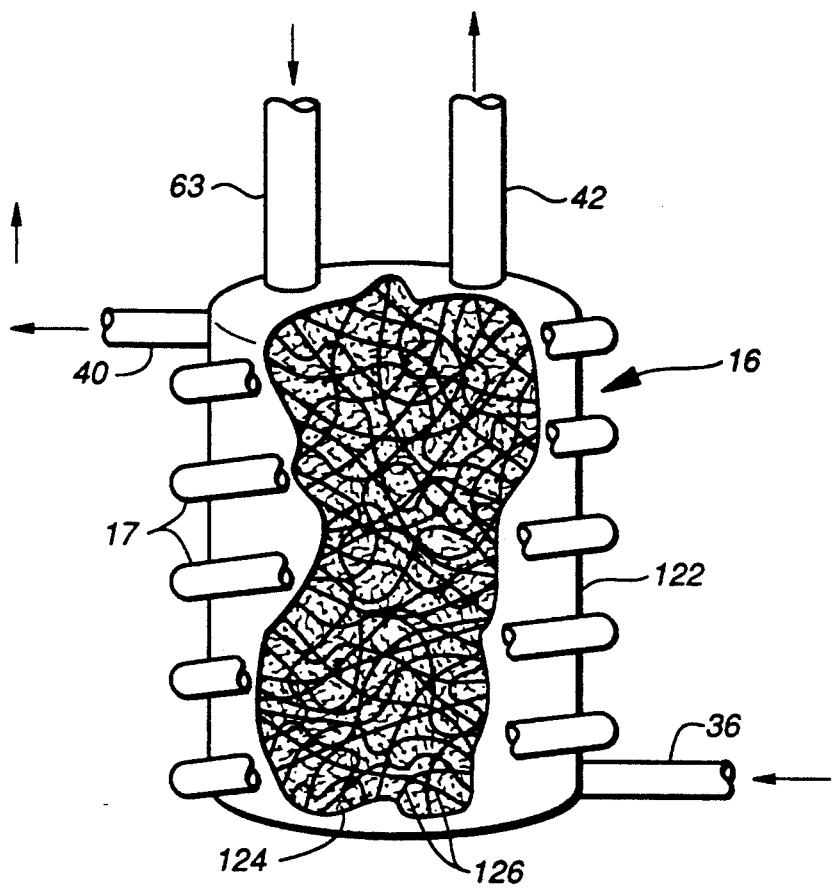
FIG._3
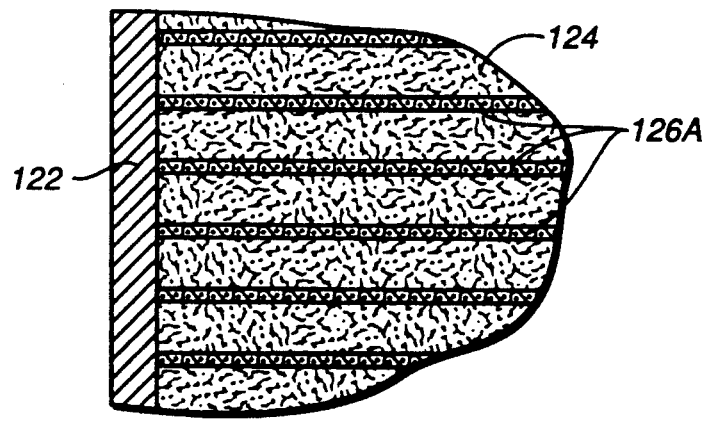
FIG._3A

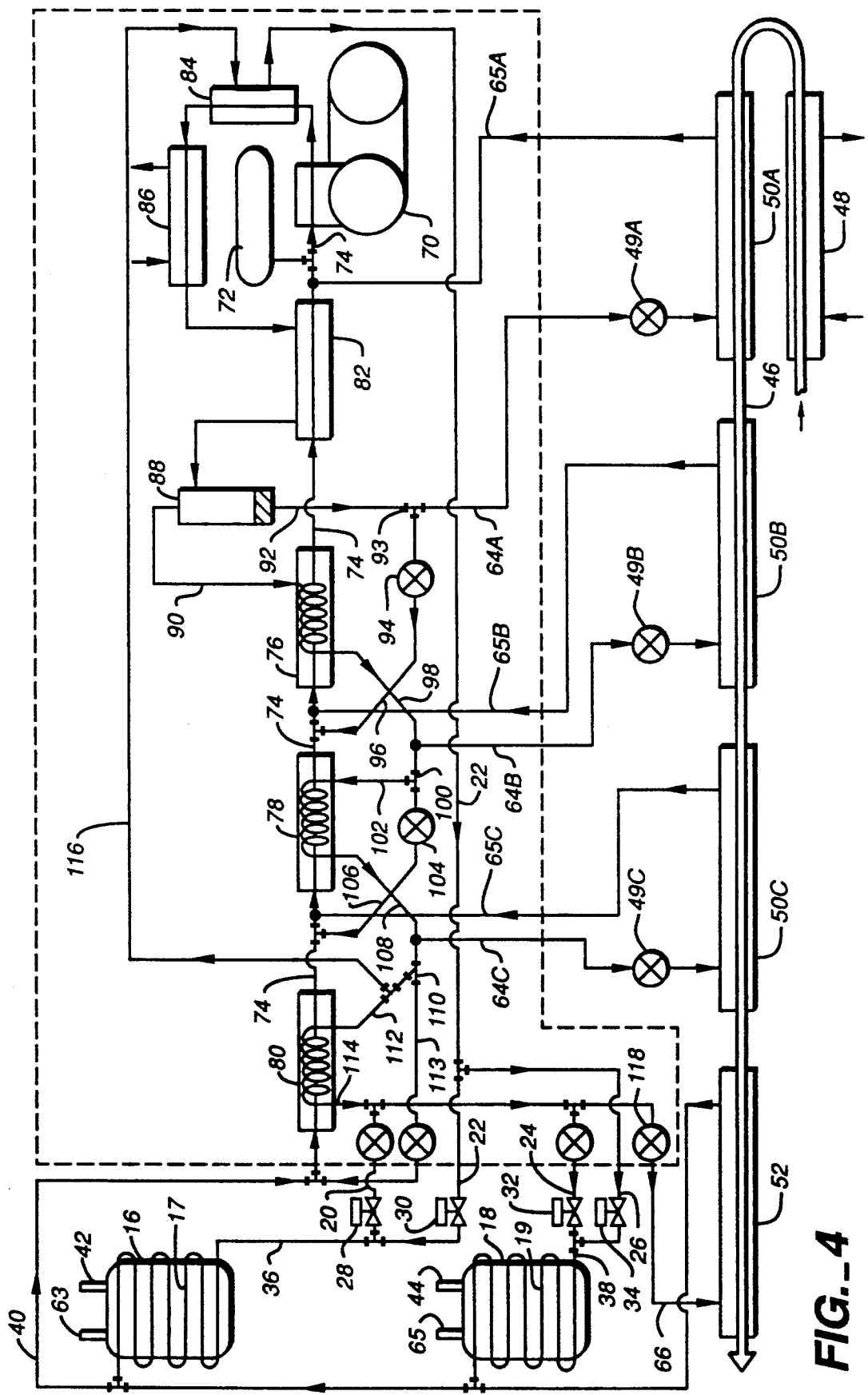
FIG._4

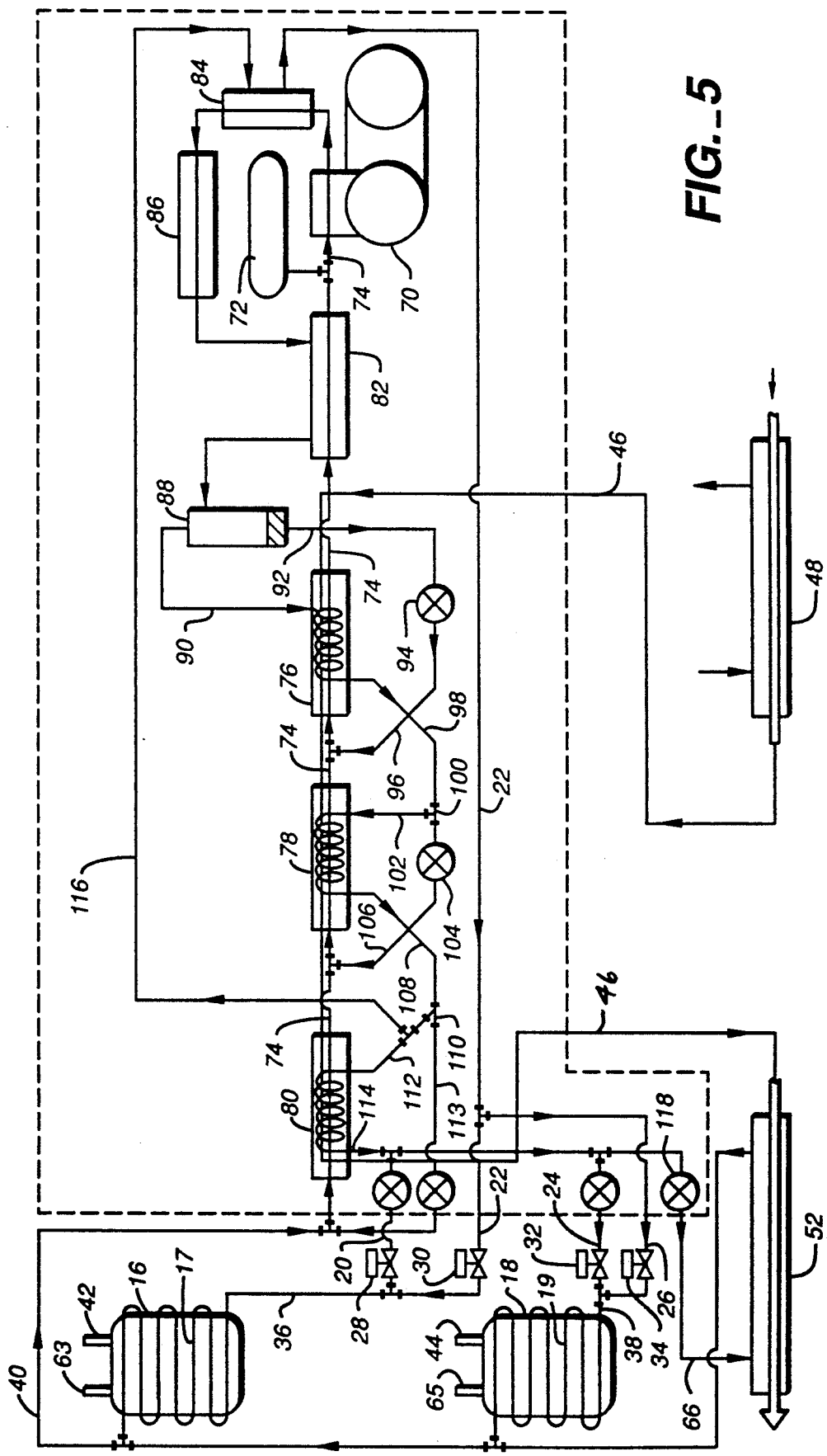
FIG._5

COMBINED CRYOSORPTION/AUTO-REFRIGERATING CASCADE LOW TEMPERATURE SYSTEM

This invention relates to refrigeration systems and more particularly to a two-stage refrigeration system utilizing a multi-function auto-refrigeration cascade (ARC) section with a cryosorption pumping circuit.

BACKGROUND OF THE INVENTION

Many industrial processes or systems require or benefit from cooling to extremely low temperature levels. Some examples are: the cooling of cyrogenic biological storage refrigerators where liquid nitrogen is not available, and/or where safety and costs can be improved; cooling apparatus which incorporates superconductive materials; cooling high speed computers which operate more efficiently at low temperatures; and cooling detectors which need to operate at very cold temperatures, e.g. gamma-ray sensors, etc. In addition to the various applications for ultra low temperature systems, there has been a continuing need and effort to develop improved low temperature systems having greater energy efficiency while also comparing favorably with prior systems with regard to cost, availability and safety. The present invention substantially alleviates these problems.

In the field of refrigeration, high stage auto-refrigeration cascade (ARC) systems are well known, and examples thereof are described in U.S. Pat. Nos. 3,768,273; 4,597,267; and 4,763,486. An ARC system combines vapor compression and vapor-liquid adsorption refrigeration principles using a refrigerant comprising a mixture of components of varying boiling points which do not form azeotropes. Pressurized vapors are dissolved into liquid phases in an adsorption process. Typical ARC system operation is as follows: (1) A compressor raises the pressure of the mixed refrigerant, (2) a condenser partially liquifies the mixture by rejection of heat to cooling water or ambient air, (3) an economizing heat exchanger may be included to further cool and further partially condense the mixture, (4) a phase separator removes the liquid condensate from the uncondensed vapor, (5) a throttle reduces the pressure of the condensate to the suction pressure, (6) the evaporating liquid leaving the throttle is mixed with vapors returning from colder portions of the system, and (7) this cold stream removes heat in a cascade condenser from the high pressure vapors exiting from the phase separator to further or completely condense the vapors. The steps of partial condensation, phase separation and throttling of the condensate are repeated as needed to provide liquid refrigerant mixes at intermediate boiling temperatures and at very low temperatures for final cooling.

Another type of refrigeration involving the use of cryosorption pumps which operate at above atmospheric pressure has been disclosed in publications such as: "Cryogenic Refrigeration Concepts Utilizing Adsorption Pumping in Zeolites", W.H. Hartwig, Univ. of Texas, Austin, TX, 1978 published in Advances in Cryogenic Engineering, Vol. 23 (1978); "Nitrogen Adsorption Isotherms for Zeolite and Activated Carbon", L.C. Yang, T.D.Vo., and H.H. Burris, Jet Propulsion Laboratory, C.I.T., Pasadena, CA (NASA contract NAS7-100), 1982; and "High Pressure Adsorption Isotherms of Hydrogen and Neon on Charcoal", E. Tward, C. Marcus, C.K. Chan, J. Gatewood, and D. Elleman (Jet Propulsion Laboratory/C.I.T., Pasadena) and W.A. Steyert (Los Alamos National Laboratory, Los Alamos, NM. These papers detail cryosorption gas pumping at above atmospheric pressure and the adsorbed gas-to-sorbent mass ratio vs. temperature for several potentially useful gases for refrigeration effects.

Still other prior art refrigeration systems capable of producing temperatures in the same range of interest as the present invention, (e.g. 90K) includes refrigeration apparatus employing helium gas as a refrigerant and utilizing Stirling, Solvay, Gifford-McMahon cycles or variations thereof. Almost all of these prior systems require some form of lubricated or oilless reciprocating or turbine mechanical gas pumps and expanders. Modified Gifford-McMahon two-stage cryorefrigerators, with activated carbon bonded onto a portion of the colder stage, have also been used to cryopump atmospheric gases from high vacuum chambers to very deep levels. They typically operate over a pressure range from about $10^{-6}$ to $10^{-12}$ atmospheres. They employ cryocondensation for most atmospheric gases and cryosorption for the lowest boiling point gases such as hydrogen and helium. Such devices do not provide the performance and advantages of the present invention.

Helium cryorefrigerators were also found to be not readily usable for cooling of remote heat loads because their inherent configuration limits them to the cooling of surfaces attached to a body where helium gas is expanded. It is possible to provide an intermediate heat transfer mechanism, such as a heat pipe or thermosiphon circuit, but this requires an added temperature difference and adds considerable cost and complexity to the system which reduces reliability. Also, with these systems it is possible to cool a surface exposed to atmospheric air cold enough to liquify oxygen out of the air and thereby create hazardous conditions. Most helium cryorefrigerators use oil lubricated compressors and elaborate oil separation systems. The last of several stages of oil removal generally is a carbon sorption bed which must be replaced periodically. This requires shutting down of the system and does not permit continuous operation for extended periods of several years. Many such systems use no-work expansion of the gas to produce cooling, but this is not thermodynamically efficient. Adding an expander which does work increases the complexity of the system. These systems are based upon mature technology and have proven reasonably reliable, although are costly because of the special components they require.

The high vacuum industry uses sorption "roughing" pumps, usually with zeolites such as "molecular sieves", to provide clean pumping prior to switching to deep vacuum pumping by other types of pumps such as titanium sublimation, ion capture, or helium refrigerated cryopumps. These sorption roughing pumps remove gases from vacuum chambers over a range starting at about 0.1 atmosphere and pumping to about $10^{-6}$ atmosphere, that is, a span of about five decades in the subatmospheric pressure range. They are cooled by liquid nitrogen to a temperature of about 77–80K for the cryosorption process and electrically heated to 450–500K for regeneration or desorption. The external electric heat source must be temperature controlled to prevent overheating. These pumps cannot be used at pressures above one atmosphere because of their design and they are unsuitable in their present configuration for combination with mechanical refrigeration cooling or incorporation as required by the present invention.

The foregoing review of existing and prior low temperature refrigeration systems indicates the need for such an improved system that is effective and reliable as well as relatively easy and economical to operate.

It is therefore an object of the invention to provide a refrigeration system that will overcome the deficiencies and solve the aforesaid problems of prior art systems and also produce colder temperatures than heretofore possible using auto-refrigeration cascade (ARC) systems.

Another object of the invention is to provide a refrigeration system that will: (1) utilize ARC techniques in combination with (2) cryosorption pumping to reliably pump a lower stage refrigerant gas with maintenance-free operation to cool refrigerant evaporators of various configurations. Cryosorption pumping at above atmospheric pressures and at a 15:1 to 25:1 pressure ratio eliminates problems usually attendant with the pumping of gases such as nitrogen or argon. Such problems include: Very high discharge temperatures at such high pressure ratios, lubrication of compressors or seals, maintenance of oilless compressors if used, and complexity of multi-stage compression.

Yet another object of the invention is to provide a refrigeration system which does not require extraneous temperature controls, or other devices which add complexity to the system for functions such as controlling the temperature of the sorbent beds during desorption or of the final evaporator to preclude oxygen condensation.

SUMMARY OF THE INVENTION

In accordance with the principles of the present invention, an auto-refrigerating cascade (ARC) system providing multiple functions as the warmer stage in a two-stage cascade refrigeration system, is combined with a second or colder stage comprising a cryosorption pumping circuit formed by parallel gas sorption beds. The colder stage is a closed circuit vapor compression type using non-lubricated, non-mechanical adsorption and desorption for pumping the gaseous refrigerant.

The ARC cascade sub-system (1) cools a high pressure first refrigerant gas stream to near the gas's condensing point, (2) at least partially condenses the gas, and (3) provides dual outputs of the first refrigerant through conduits that alternately cool and heat the gas sorption beds. One output from the sub-system provides a first refrigerant to a sorbent bed at an elevated temperature (360–400K). Another output from the sub-system provides the first refrigerant at a lower temperature (120–150K) to another sorbent bed. Raising the sorption bed's temperature starts desorption of a second refrigerant therein and pumps the previously absorbed low temperature second refrigerant gas from a lower (suction) pressure to a higher (discharge) pressure for gas circulation in a closed circuit. Reducing the sorbent bed's temperature starts adsorption, and causes the second refrigerant to circulate through a cryosorption circuit. Further cooling of the second refrigerant in the closed cryosorption circuit is provided by the sub-system at very low temperatures to remove heat of adsorption during the cryosorption process. The adsorption and desorption pumping cycles are controlled by solenoid valves on the sub-system connected to suitable timing or control means.

The present invention provides a refrigeration system that is less costly to manufacture than existing low temperature systems for comparable performance and is also is more energy efficient in some applications. For some specific applications, the present system may be the only viable method of providing the required cooling. It can replace liquid nitrogen in many cooling applications where costs, availability or safety are current problems.

Other objects, advantages and features of the invention will become apparent from the following detailed description of one embodiment, presented in conjunction with the accompanying drawing.

BRIEF DESCRIPTION OF THE DRAWING

FIG. 1 is a diagrammatic view of a refrigeration system embodying principles of the present invention.

FIG. 2 is a diagrammatic view of a refrigeration system according to the invention and showing a typical auto-refrigeration cascade (ARC) subsystem in greater detail.

FIG. 3 is a view in elevation and in section showing a typical sorption bed used in the refrigeration system of the present invention.

FIG. 3A is a fragmentary view in section showing an alternate form of sorbent bed embodying principles of the invention.

FIG. 4 is a diagrammatic view similar to FIG. 2 showing a modified form of refrigeration system utilizing principles of the present invention.

FIG. 5 is a diagrammatic view similar to FIG. 2 showing yet another modified form of refrigeration system according to the invention.

DETAILED DESCRIPTION OF EMBODIMENT

With reference to the drawing, FIG. 1 shows in diagrammatic form a refrigeration system 10 according to the present invention which is capable of achieving extremely low temperature levels. In broad terms, the system 10 comprises an auto-refrigerating cascade (ARC) module 12 utilizing a first refrigerant and forming a relatively warmer stage which is connected to and functions with a colder stage in the form of a cryosorption pumping circuit 14 of the closed circuit vapor compression type utilizing a second refrigerant and using non-lubricated, non-mechanical adsorption and desorption for cryo-pumping the gaseous second refrigerant through a conduit 46. The cryosorption pumping circuit 14 is comprised of a plurality of sorption beds 16 and 18 which are described in greater detail below with reference to FIG. 3.

In the embodiment shown in FIG. 1, two beds are used, but one or more additional sorption beds could be used, if desired. Each sorption bed receives either a flow of hot gas or cold evaporating refrigerant from the ARC system. Thus, as shown, the ARC module 12 utilizing a first refrigerant, is provided with a first set of outlet conduits 20 and 22 and a second set of outlet conduits 24 and 26. The conduits 20, 22 have a pair of electrically controlled valves 28, 30, respectively and the conduits 24, 26 have a similar set of valves 32, 34. The conduits 20, 22 are joined together downstream of their valves to form a single conduit 36 which extends to and is coiled around or within the first sorption bed 16.

Similarly, the conduits 24, 26 are connected to a single conduit 38 that extends to and is coiled around or within the second sorption bed 18. A return conduit 40 for conduits 36 and 38 extends back to the ARC module.

In the cryosorption pumping circuit 14, an outlet conduit 42 through a valve 43 from the first sorption bed 16 and an outlet conduit 44 through a valve 45 from the second sorption bed 18 are connected together to form the low (colder) stage refrigerant conduit 46 for the second refrigerant which first passes through a water or air cooled desuperheater 48. The circuit conduit 46 then passes successively through a refrigerated desuperheater 50, a refrigerated condenser 52, an economizer heat exchanger 54, a throttle 56 and a final evaporator 58 before passing again through the economizer heat exchanger 54 and back through a pair of valves 60 and 62 connected to inlets 63 and 65 on the first and second sorption beds respectively.

First and second conduits 64 and 66 extend from the ARC module 12 to supply refrigerant therefrom to the refrigerated desuperheater 50 and the refrigerated condenser 52 respectively. These conduits then circulate back to the ARC module. Cooling water from a suitable source is circulated through inlet and outlet conduits 68 to the ARC module.

Operation of the system 10 shown in FIG. 1 may be described as follows. The second refrigerant, in the form of hot (e.g. 383K) high discharge pressure (25-35 atm) gas stream (i.e. Argon) at valves 43 and 45 desorbing from sorption beds (16 or 18) flows through the water (or air) cooled desuperheater 48 for precooling the gas to about 296-310K. Desuperheater 48 is cooled by an external source (not shown) as indicated by the in and out arrows. The refrigerated desuperheater 50 further cools this gas stream in intermediate stages to within 20-40K of its condensing point. Refrigerants from the ARC system, boiling at incrementally lower temperatures, supply cooling to the desuperheater 50 via the conduit 64. The gas stream in conduit 46 leaving desuperheater 50 is around 300K.

The coldest boiling refrigerant from the ARC modules cools and at least partially condenses the high (discharge) pressure gas stream in the condenser 52 and this gas stream exits therefrom at a temperature around 165K. The economizer heat exchanger 54 further removes heat from and subcools the high pressure condensate under some operating conditions or completes condensation under others so that the gas stream exits therefrom at around 140K. The cooling of economizer 54 is described below.

The throttling device 56 reduces the pressure of the high (discharge) pressure liquid condensate in conduit 46 leaving heat exchanger 54 to a low (suction) pressure and feeds this refrigerant into the final evaporator 58, at a temperature of around 90K, which is the coldest temperature produced in the system 10. Here the low pressure refrigerant boils and removes heat from its surroundings. This low pressure refrigerant vapor in conduit 46 leaving evaporator 58 (at around 95K) flows through the economizer heat exchanger 54, thereby removing heat from the counterflowing high pressure stream as mentioned above.

The vapor leaving heat exchanger 54, which remains cold, returns to the cold sorption bed 16 or 18 via an inlet valve 60 or 62, is captured by cryosorption and held in the bed until the bed is heated (regenerated) by raising its temperature to 360-400K by warm refrigerant vapor from the ARC system 12. This high temperature causes the bed to desorb its adsorbed gas/vapor.

When sorption bed 16 (or 18) has cryosorbed gas until it no longer can adsorb gas fast enough to maintain the required low (suction) pressure in evaporator 58, the bed is regenerated. This is done by controlling the ARC valves 28 or 32 to provide refrigerant at the elevated temperature, thereby heating a sorbent bed with mixed refrigerant from the ARC module to start its desorption (regeneration) cycle. The inlet valve 60 or 62 to sorption bed 16 or 18 closes when the gas pressure in the sorption bed rises above low (suction) pressure and its outlet valve 43 or 45 opens when the pressure in the sorption bed rises above the high (discharge) pressure. In the meantime, the other bed 18 is recooled after regeneration to be ready to start its cryosorption cycle. The inlet and outlet valves 60, 62 and 43, 45 may be either spring loaded for automatic pressure difference operation or electrically operated and controlled by a suitable timing or control means.

Various configurations of ARC systems may be used within the scope of the invention. One suitable ARC system 12A, as shown in FIG. 2, includes a mixed refrigerant compressor 70 which draws low pressure vapor (e.g. 280K and 2 atm.) from a suction pipe 74 and, under startup or load reduction conditions, also from an expansion-storage vessel 72. The suction pipe extends through a series of cascaded heat exchangers 76, 78 and 80 and also an economizer auxiliary condenser 82 before being connected with an outlet for the expansion storage vessel 72. The outlet conduit of the compressor passes through a refrigerant vapor superheating heat exchanger 84 and a condenser 86 before passing through the auxiliary condenser 82. Connected to the latter condenser is a first phase separator 88 having a vapor outlet 90 near its upper end connected to the heat exchanger 76 and a liquid outlet 92 at its lower end which is connected to both the refrigerated desuperheater 50 and cascade heat exchanger 76. The vaporized refrigerant in the outlet 90 passes through coils in the heat exchanger 76 while the liquid conduit 92 from separator 88 is furnished through a separator 93 to a throttling valve 94 whose outlet 96 is connected to the line 74 between heat exchangers 76 and 78. The output conduit 98 from the coils in heat exchanger 76 is connected to a separator 100 whose vapor outlet 102 is connected to an inlet conduit for coils in the cascade heat exchanger 78. The liquid conduit from the separator 100 is connected to a throttling valve 104 whose outlet 106 is connected to the line 74 between the heat exchangers 78 and 80. An outlet 108 from the coils in the heat exchanger 78 is connected to another separator 110. A vapor line 112 from the separator 110 is connected to coils in the final cascade heat exchanger 80 which has an outlet 114. Branching from the line 112 is a return vapor line 116 which provides an inlet to coils in the superheating heat exchanger 84.

Connected to the ARC system in accordance with the invention are the first and second cryosorption beds 16 and 18, also shown in FIG. 1. The first cryosorption bed 16 connected to the outlet conduit 114 from heat exchanger 80 has external coils which are connected through the solenoid valve 28 to its inlet conduit 36. This inlet conduit also receives vapor through a valve 30 from the conduit 22 connected to the coils in the superheating heat exchanger 84.

The second cryosorption bed 18 has external coils which are also connected to the outlet conduit 114 from heat exchanger 80 through solenoid valve 32 and its throttling valve. Another conduit 26 containing solenoid valve 34 extends between the inlet conduit 38 to the bed 18 and the outlet conduit 22 from the superheating chamber 84.

The ARC module 12A of FIG. 2 operates as follows: Mixed refrigerant compressor 70 draws low pressure vapor (e.g. 280 K and 2 atm.) from suction pipe 74 and, under startup or load reduction conditions, also from expansion-storage vessel 72 and expels compressed hot vapor to the superheating exchanger 84. Condenser 86 then removes both heat of compression and a portion of latent heat of condensation from the vapor stream. Conduit 87 from condenser 86 carries the high pressure vapor and partial condensate mixture to the economizer-auxiliary condenser 86 in which heat is transferred from the warmer high pressure refrigerant to cooler low pressure returning suction refrigerant. This further-cooled high pressure two-phase mixture enters the first phase separator 88 and then flows to the cascade heat exchangers 76, 78 and 80 and additional partial or full-phase separator(s) 100 and 110.

Condensate is withdrawn from the stream at each separation point, throttled to lower pressure, fed into the suction pipe 74 mixed with the lower pressure return refrigerant stream and evaporates at a lower temperature in the cascade condensers. This thereby further cools and at least partially condenses the high pressure refrigerant vapor exiting from the same phase separator 88 while passing in counterflow through the cascade condensers.

The coldest (last) phase separator 110 retains liquid refrigerant at its bottom for exit via line 113 and passes gaseous and possibly some liquid refrigerant to final cascade heat exchanger 80 via line 112. Cryogenic refrigerant condensate leaves cascade heat exchanger 80 and is throttled by throttling device 28 or 32.

When liquid refrigerant solenoid valve 28 or 32 is energized, it opens and directs cold refrigerant via pipe 36 or 38 to cooling-heating coils 17 or 19. This cools sorption bed 16 or 18 in preparation for cyrosorption pumping. During cooling, hot refrigerant vapor solenoid valve 30 or 34 is deenergized and closes. After the bed is cooled, gas cryosorption starts and cooling continues, removing heat of sorption until the sorption bed 16 or 18 reaches its gas optimum holding capacity and therefore requires regeneration by desorption.

To heat sorption bed 16 Or 18 for its regeneration by desorption, cooling is turned off by closing liquid refrigerant solenoid valve 28 or 32, and opening hot refrigerant vapor solenoid valve 30 or 34. The source of the hot refrigerant vapor is the cold compressed gaseous refrigerant which leaves separator 110 and passes to superheating exchanger 84 via line 116 to solenoid valve (30 or 34) and line (36 or 38) and into cooling-heating coils (17 or 19) for the sorption beds 16 and 18.

At all times, including sorbent cooling and heating, low pressure refrigerant fluid leaves the cooling-heating coils (17 or 19) via return pipe 40 to ARC system 12A, flowing through cascade heat exchangers 76, 78 and 80 via line 74 and through auxiliary condenser 82 to compressor 70.

The cascade heat exchangers 76, 78 and 80 are refrigerated during the sorbent heating cycle by the flow of liquid refrigerant through the several internal throttling devices and evaporation of this liquid refrigerant as it mixes with returning low pressure refrigerant fluid in the cascade heat exchangers.

A portion of liquid refrigerant leaving the final heat exchanger 80 flows through a throttling device 118 and continuously cools the refrigerated condenser 52. A portion of condensate from phase separator 88 flows through conduit 92 to the separator 93 and from thence through a conduit 64 to a throttling device 120 and into refrigerated desuperheater 50 to provide further continuous cooling of the second refrigerant in the conduit 46. Refrigerant vapor leaving desuperheater 50 returns to an intermediate point in the low pressure return pipe 74 of the ARC circuit. This additional cooling or conditioning of the second refrigerant in the conduit 46 enables the cryosorption circuit 14 to achieve low temperature operating levels.

Other arrangements of the ARC sub-system are possible. The above configuration is a typical example and is not intended to exclude variations.

For example, in a modified form of the invention shown in FIG. 4, the single desuperheater 50 of system 10 may be provided as three separate or discrete desuperheater sections 50A, 50B and 50C in series with the low stage refrigerant conduit 46 extending through each of them. Each desuperheater section is cooled by the evaporation of sequentially colder refrigerants supplied by the ARC circuit. Liquid refrigerant is withdrawn from the several liquid-vapor separators 88, !00 and 110 in the ARC circuit, throttled to low pressure and evaporated within the heat exchangers of desuperheater sections 50A, 50B and 50C to desuperheat the low stage gas from about 290K to near its condensation temperature. As shown in FIG. 4, the section 50A receives refrigerant from phase separator 88 via a conduit 64A through a throttling valve 49A and returns it to the suction line 74 via a conduit 65A. The desuperheater section 50B receives refrigerant from line 98 via a conduit 64B and through a throttling valve 49B and returns it via a conduit 65B to the suction line 74 between heat exchangers 76 and 78. Similarly, the desuperheater section 50C receives refrigerant from line 104 via a conduit 64C and through a throttling valve 49C and returns it via a conduit 65C to the suction line 74 between the heat exchangers 78 and 80. Thus, the configuration of FIG. 4 provides for progressive cooling of the refrigerant through the desuperheater sections in series compared with the arrangement of FIG. 2. In operation, the system of FIG. 4 thermodynamically more efficient and hence requires a lower power input because of the stepped cooling it produces.

In another alternative embodiment of the invention as shown in FIG. 5, either tri-axial or double co-axial heat exchangers are utilized in the ARC circuit. Here, the refrigerant in line 46 flowing from desuperheater 48 is passed sequentially through the condenser 82 and the heat exchangers 76, 78 and 80, in contra-flow to the low pressure suction pipe 74. Thus, the low stage refrigerant gas in line 46 is desuperheated directly within auxiliary condenser 82 and cascade heat exchangers 76, 78 and 80 and desuperheater 50 is eliminated. This arrangement has the same advantages as those of the above alternative of FIG. 4. In addition, heat transmission losses are reduced by virtue of the intimate heat exchanger configuration. However, design and fabrication of such tri-axial or double co-axial heat exchangers is somewhat more complex than the other configurations.

Also, in the arrangement of FIG. 5 hot discharge refrigerant leaving compressor 70 can, if desired, be fed directly to conduit 22 after passing through suitable oil removing devices (not shown) for heating and regeneration of sorption beds 14. In this case, superheating heat exchanger 84 and conduit 116 could be eliminated.

As shown in FIG. 3, the sorption beds 16 and 18 are essentially pressure vessels, typically cylindrical and consisting of a thin (for minimum thermal mass) stainless steel housing 122.

Within the housing is a suitable sorbent material 124 such as activated carbon or molecular sieves which fills the interstice around a high-thermal-conductivity open-matrix material 126. The housing is surrounded by coils 17 of the cooling heating conduit 36 which are in thermal contact with the vessel wall. The matrix material 126 enhances heat transfer between the cooling-heating pipes in close thermal contact with the housing and the sorbent material 124 filling the voids of the matrix, and this greatly shortens equilibrium times after temperature changes.

The matrix material 126, which must be open to allow proper gas flow, may be selected from several forms. One form, as shown in FIG. 3A may consist of a series of copper or aluminum screen disks with their edges in thermal contact with the walls 122 and evenly spaced to hold an appropriate amount of sorbent material 124 in each layer. Suitable disk spacing is 0.5 inch or less for a six-inch diameter sorption bed. At this diameter, the disks should have an equivalent density of about 2% of solid metal including the sorbent space, that is, the metal should occupy 2% of the entire bed volume. To maintain a constant temperature difference between the vessel wall and center of the disk, the disk density should vary as the square of the vessel diameter. Copper is preferable to aluminum because of its greater thermal diffusivity. Another form may consist of perforated copper or aluminum sheets or plates arranged in a manner similar to the screens described above. Still another form shown in FIG. 3, may be a metal skeletal (open foam) structure with openings large enough to allow properly sized sorbent material particles 124 to fill the pores in the foam.

Criteria for the design of the sorbent bed include: an overall (combined matrix plus sorbent) thermal diffusivity sufficient to attain reasonably short transient times between the highest and lowest temperature levels for desorption and sorption; low thermal mass of the non-sorbent materials, that is, the matrix 126, to reduce heating and cooling energy requirements; and an adequately open structure for the second refrigerant to freely flow into the space containing the sorbent materials 124. The best choice is a combination of a sorbent and matrix which requires the least heating or cooling energy and attains temperature equilibrium in the shortest time and which absorbs and desorbs the greatest amount of second refrigerant in the smallest volume.

The sorbent material, either zeolite molecular sieves or activated carbon (charcoal), is selected to have the best pore structure for most desired cryosorption and desorption characteristics for the low stage refrigerant which may be argon, nitrogen or a mixture of the two.

Temperature cycling of the sorbent beds 16 and 18 can be determined by time, temperature, pressure or by a combination of these factors. Time control is simplest but does not react to changes in heat loads imposed on the system. Low stage circuit suction and discharge gas pressures change during both cryosorption and regeneration-desorption periods and therefore can be used to moderate the timing of cyclic operation. Likewise, sorption bed temperatures also can be used to improve cyclic performance and to control pressure fluctuations by anticipating near saturation or near completion of desorption of the beds.

If the time required for desorption (regeneration) is too long and the remaining time for precooling to adsorption temperature is then too short, one or more additional sorption beds may be added to the system. With sufficient sorption bed capacity, there is continuous pumping action using cyclic heating (desorption) and cooling (adsorption), not unlike a conventional multi-cylinder reciprocating compressor. A sorption bed 16 or 18 does not start adsorbing refrigerant gas from the "suction" line 74 until the bed's temperature is cold enough to reduce the pressure below the system's "suction" pressure, nor does it start desorbing into the system's "discharge" line until it is hot enough to increase the pressure in its housing to above the system's "discharge" pressure.

Typical operating temperatures are 120–150K for adsorption (cryosorption pumping) and 360–400K for desorption for a system using activated carbon sorbent and argon or nitrogen as a refrigerant. With a system 10 according to the present invention, refrigerant evaporation temperature down to approximately 85–95K should be possible using argon gas.

Electrically operated flow control valves 28, 30, 32, 34 alternately control the flow of hot gas or cold evaporating refrigerant in conduits 36 and 38 from the auto-refrigerating cascade module 12. A pair of valves, one hot and one cold, serve each sorption bed. A timer or other suitable controller (not shown) may be used to energize these valves in the proper sequence to provide the periodic cooling or heating functions.

Since the heat for regeneration of sorption beds 16 and 18 comes from the rejected heat from the ARC module 12, there is no requirement for an outside source of heat nor for temperature control devices. The only source of energy required for the system 10 is electrical power to drive the ARC refrigeration module 12. Cooling water for heat removal from ARC module 12 and the gas desuperheater 48 is the only other utility required.

Several single components or multi-component-mixtures are usable for the low temperature refrigerant gas. They include nitrogen, argon or mixtures of both and possibly mixtures including nitrogen or argon and krypton. Mixtures may be limited in their use by the selective sorption characteristics of the sorbents employed. In the case of mixtures, the role of economizer heat-exchanger becomes far more important. Both final condensation of the high pressure mixture and final evaporation of the low pressure refrigerant mixture take place in this heat exchanger. This causes greater amounts of heat to be transformed as compared to single phase liquid subcooling or gas superheating. The refrigerated condenser 52 in system 10 only partially condenses the mixture.

In summary, the refrigeration system 10 utilizing principles of the present invention provides several advantages and increased refrigeration efficiency by combining: (1) the energy-efficient operation of an ARC system 12 for precooling in steps the high pressure low temperature refrigerant gas, (2) the ability of the ARC system to provide controlled temperature cycling of low stage sorption beds when needed for their desorption and recooling, and (3) the steady cryogenic cooling from the ARC for condensing the high pressure precooled low temperature refrigerant in the lower temperature stage of a cascade cycle.

The "compressor" in this low temperature circuit, namely the sorption beds 16 and 18 which alternately employ cryosorption and heated desorption, are completely oilless and free of moving parts except for their inlet and outlet gas valves. This system requires neither complex nor specially fabricated machined parts or linkages for compressors or expanders which makes it more economical to make and more reliable.

The high pressure liquid refrigerant is throttled to achieve final cooling. This is thermodynamically more efficient than no-work Joule-Thompson throttling (expansion) of a gas. The low temperature refrigerant can be evaporated in a wide variety of heat exchanger configurations which may be located either remote or within the system. No secondary heat transfer methods are required.

The inherent characteristics of the system 10 can prevent liquification of oxygen from atmospheric air without resorting to special safety devices which might not always work properly.

Heat for regeneration of the sorption bed is "free" since it is available at a suitable temperature as a portion of the heat rejected by the ARC higher stage and which otherwise would be transferred to the cooling water. No temperature control device is required for the heat source because it inherently is rejected from the ARC system at a suitable level.

There are no contaminants introduced into the sorption beds because there are no oil lubricated parts in the low temperature gas circuit.

Refrigerants used for the cold stage cryosorption circuit 14 may comprise several single components or multi-component-mixtures which makes it possible to tailor the system for optimum operation for various applications.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. Apparatus for producing low temperature refrigeration comprising:
    a refrigeration sub-system including means for circulating a first refrigerant to provide alternately two outputs for different time periods including a first output at a relatively warm temperature level and a second output at a relatively cold temperature level;
    a cryosorption pumping circuit comprised of a closed loop conduit for a second refrigerant, said conduit circuit being connected to a plurality of sorbent beds;
    conduit means interconnecting said refrigeration sub-system and said cryosorption pumping circuit including valve means for alternately controlling the flow of said first refrigerant at its warm and cold temperature levels for selected time periods sufficient to cause cyclic adsorption and desorption of said second refrigerant material in said sorbent beds; and
    external conditioning means for utilizing said first refrigerant to cause further temperature reduction of said second refrigerant in said closed loop conduit of said cryosorption pumping circuit.

2. The apparatus as described in claim 1 wherein said refrigeration sub-system comprises an auto-refrigerating cascade system.

3. The apparatus as described in claim 1 wherein said first refrigerant comprises multi-component fluids of varying boiling points.

4. The apparatus as described in claim 1 wherein said cryosorption pumping circuit includes two sorbent beds.

5. The apparatus as described in claim 4 wherein said conduit in said cryosorption circuit for said second refrigerant is connected to outlets in said sorption beds and extends through said external conditioning means for said cryosorption circuit to inlets on said sorption beds.

6. The apparatus as described in claim 5 wherein said external conditioning means comprises:
    a low-stage desuperheater connected to a fluid source for initially cooling second refrigerant from said sorbent beds;
    a secondary refrigerated desuperheater connected to said refrigeration sub-system for further cooling vapor in said conduit;
    a refrigerated condenser connected to said refrigerated sub-system for condensing at least a portion of the vapor in said conduit;
    an economizer heat exchanger, a throttling valve and an evaporator connected in series; and
    a section of said closed loop conduit between said evaporator and said sorbent beds extending back through said economizer heat exchanger.

7. The apparatus as described in claim 6 wherein said refrigerated desuperheater and said refrigerated condenser are connected to said refrigeration sub-system to receive said circulating first refrigerant to provide additional cooling for said second refrigerant in said closed loop conduit.

8. The apparatus as described in claim 6 wherein said external conditioning means comprises means for supplying a condensed quantity of said first refrigerant through a throttling valve to said secondary desuperheater and returning it in vapor form to said sub-system.

9. The apparatus as described in claim 8 wherein said secondary desuperheater is comprised of a plurality of heat exchangers connected in series, each said heat exchanger being cooled by condensed quantities of said first refrigerant furnished through a separate throttling valve from said sub-system.

10. The apparatus as described in claim 6 wherein said refrigeration sub-system includes a series of cascaded heat exchangers in series each of which is cooled by a vapor portion of said first refrigerant and a vapor return line for said first refrigerant extending through each said cascaded heat exchanger.

11. The apparatus as described in claim 10 wherein said vapor line for said first refrigerant is further cooled by a counter-flow through each said cascaded heat exchanger of a section of said closed loop conduit containing said second refrigerant.

12. The apparatus as described in claim 4 wherein each said sorbent bed comprises a pressure vessel having means for allowing said second refrigerant to flow in and out, a high thermal-conductivity open-matrix material within said container surrounded by particles of sorbent material and together provide an interior structure which allows said second refrigerant to flow freely within the container.

13. The apparatus as described in claim 4 wherein said matrix material comprises a series of spaced apart metal screen disks with sorbent particles between the disks.

14. The apparatus as described in claim 1 wherein said second refrigerant in said cyrosorption pumping circuit comprises a mixture of nitrogen and argon.

15. The refrigeration system of claim 1 wherein said external conditioning means includes a desuperheater means through which a portion of said closed loop conduit section for said cryosorption pumping circuit passes.

16. The refrigeration system of claim 15 wherein said desuperheater means comprises a plurality of heat exchangers connected in series.

17. The refrigeration system of claim 15 wherein said desuperheater means comprises a counterflow section of said closed loop conduit in said cryosorption pumping circuit which flows through said heat exchangers of said first circuit.

18. A refrigeration system comprising:
a first closed looped refrigeration circuit having a dual output including a first outlet means providing a first refrigerant at a relatively warm temperature level and a second outlet means providing the refrigerant at a relatively cold temperature level;
a second closed looped refrigeration circuit containing a second refrigerant and connected to said first circuit and including a pair of sorbent beds, said first circuit including coils for warming or cooling said sorbent beds;
external conditioning means for further cooling said second refrigerant in said second circuit including heat exchanger means, separator means and throttling means; and a third output from said first circuit connected to said conditioning means for further cooling said second refrigerant as it flows through said conditioning means.

19. A method for producing low temperature refrigeration comprising the steps of:
providing a first closed-loop refrigeration sub-system for a first refrigerant to provide two controllable alternating outputs at relatively warm and relatively cool temperatures;
providing a second closed loop refrigerant circuit for a second refrigerant including a pair of sorbent beds;
utilizing said relatively cool output of said sub-system to cause adsorption of said second refrigerant; and
utilizing said relatively warm output of said sub-system to cause desorption of said second refrigerant to thereby pump low temperature refrigerant in said second circuit from a lower pressure to a higher pressure; and
removing heat from said second refrigerant after said desorption.

20. The method of claim 19 wherein said step of removing heat of desorption is accomplished using said relatively cool output from said refrigeration sub-system.

21. The method of claim 19 wherein said sub-system utilizes a mixed refrigerant and includes the sub-steps of compressing the refrigerant, cooling said refrigerant to partially liquify it and separate high pressure vapor and liquid phases thereof, throttling the high pressure vapor, and further removing heat from said refrigerant to completely condense it, and repeating said sub-steps as needed to provide liquid refrigeration mixes at intermediate boiling temperatures and at very low temperatures for final cooling by said sorbent beds.

* * * * *